US006889552B2

(12) United States Patent
Nguyen et al.

(10) Patent No.: US 6,889,552 B2
(45) Date of Patent: May 10, 2005

(54) ACOUSTIC WAVEGUIDE SYSTEM

(75) Inventors: Toan H. Nguyen, Needham, MA (US); Lawrence C. Lynnworth, Waltham, MA (US)

(73) Assignee: Panametrics, Inc., Waltham, MA (US)

( * ) Notice: Subject to any disclaimer, the term of this patent is extended or adjusted under 35 U.S.C. 154(b) by 208 days.

(21) Appl. No.: 10/256,448

(22) Filed: Sep. 27, 2002

(65) Prior Publication Data

US 2004/0060767 A1 Apr. 1, 2004

(51) Int. Cl.[7] ................................................ G01N 29/00
(52) U.S. Cl. ........................................................ 73/632
(58) Field of Search ..................... 73/632, 644, 861.18, 73/861.25, 861.26, 861.28, 816.29, 861.31, 642

(56) References Cited

U.S. PATENT DOCUMENTS

| | | | | |
|---|---|---|---|---|
| 3,514,747 A | | 5/1970 | Lynnworth et al. | |
| 3,540,265 A | | 11/1970 | Lynnworth | |
| 3,636,754 A | | 1/1972 | Lynnworth et al. | |
| 4,077,023 A | * | 2/1978 | Boyd et al. | 333/147 |
| 4,336,719 A | * | 6/1982 | Lynnworth | 73/861.27 |
| 4,452,334 A | | 6/1984 | Rogers | |
| 4,893,496 A | * | 1/1990 | Bau et al. | 73/32 A |
| 5,179,862 A | * | 1/1993 | Lynnworth | 73/861.28 |
| 5,456,114 A | | 10/1995 | Liu et al. | |
| 5,713,916 A | * | 2/1998 | Dias | 606/169 |
| 6,047,602 A | * | 4/2000 | Lynnworth | 73/632 |

OTHER PUBLICATIONS

C.F. Brockelsby, J.S. Palfreeman, and R.W. Gibson, "*Ultrasonic Delay Lines*", pp. 135, 140 London ILIFFE Books, Ltd, 1963.

* cited by examiner

*Primary Examiner*—Helen Kwok
(74) *Attorney, Agent, or Firm*—Iandiorio & Teska

(57) ABSTRACT

An acoustic waveguide system including a waveguide, a housing with a port in one side of the housing for receiving the proximal end of the waveguide, the port opening into a channel in the housing. A first shear transducer is located in the channel of the housing and disposed on the waveguide, and a second shear transducer is located in the channel and disposed on the opposite side of the waveguide. The first and second transducers are configured to launch a torsional or an extensional wave in the waveguide depending on the orientation and polarity of the transducers.

84 Claims, 12 Drawing Sheets

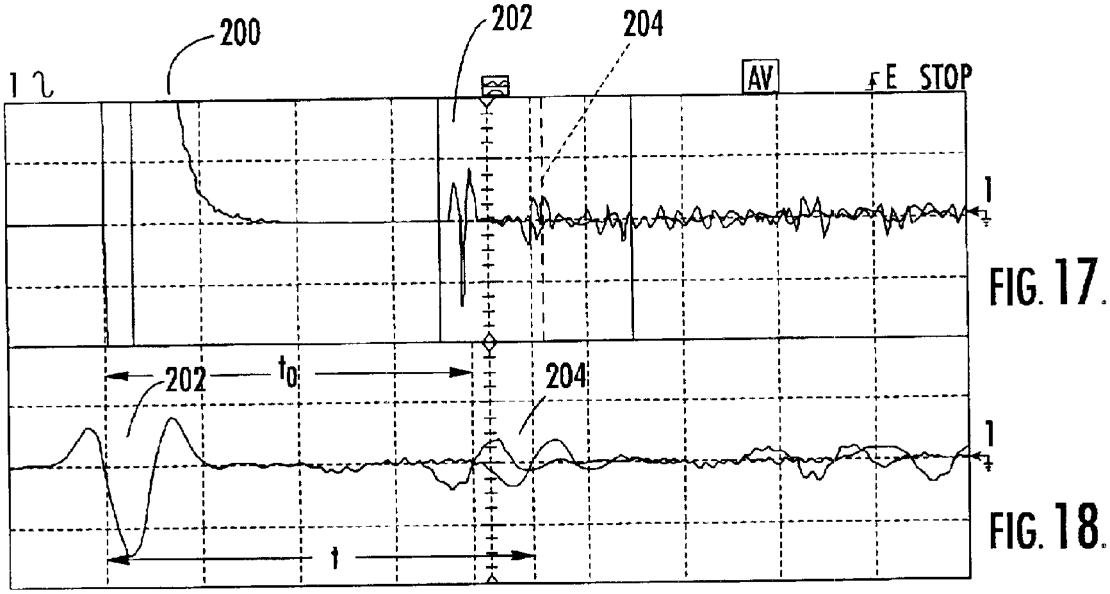
FIG. 17.
FIG. 18.
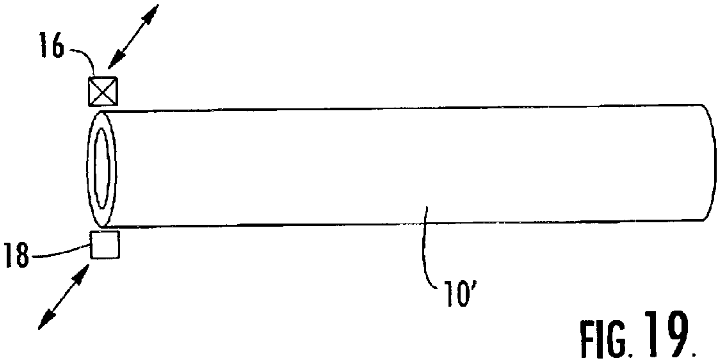
FIG. 19.
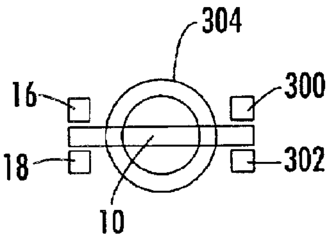
FIG. 20.

ACOUSTIC WAVEGUIDE SYSTEM

FIELD OF THE INVENTION

This invention relates to an acoustic waveguide system for launching one or more of torsional, extensional, and flexural mode ultrasonic waves into a waveguide, typically an elongated waveguide, and sensing echoes and/or transmission through portions of said waveguide, or through the entire length of said waveguide.

BACKGROUND OF THE INVENTION

Acoustic waveguide systems, wherein torsional, extensional, and/or flexural mode ultrasonic waves are launched by a transducer into a solid, rod-like, elongated elastic waveguide, are used to measure the density, level, and/or temperature of the fluid surrounding the waveguide. See U.S. Pat. Nos. 3,636,754; 3,514,747; 3,540,265; 4,452,334; and 5,456,114 incorporated herein by this reference. Depending on the waveguide cross section, the measured torsional wave transit time (echo) is a function of the density, viscosity, level, and temperature of the fluid surrounding the waveguide. The measured extensional wave transit time is primarily a function of the temperature of the waveguide.

In the prior art, however, the transducer usually consisted of electromagnetic coils surrounding a magnetostrictive segment of the waveguide. The coils are mounted about 10 centimeters apart along the magnetostrictive segment of the waveguide so that each coil can be biased and alternately driven to maximize the energy in each of the modes. The extensional and torsional mode acoustic waves are launched in the waveguide by means of the well-known Joule and Wiedemann effects, respectively. The Joule effect, or longitudinal magnetostriction, produces a longitudinal extension in the magnetostrictive rod when a pulse is applied to a coil surrounding the rod which produces a magnetic field parallel to the rod. The Wiedemann effect, or torsional magnetostriction, produces a torsional stress pulse in a magnetostrictive rod when a pulse is applied to a coil surrounding the rod which opposes a circumferential magnetic field surrounding the rod, as produced by a DC current flowing through the rod. Alternatively, since the magnetostrictive rod contains magnetic material, the rod may be initially conditioned to produce the circumferential magnetic field by polarizing the rod before assembly. A large DC current is passed through the magnetostrictive segment prior to its assembly to produce the proper polarization in the segment. Thus, the torsional wave may be launched directly using the coil. A permanent magnet adjacent the coil may be provided and aligned to cancel the effects of the circumferential field in the area of the coil. See also *Ultrasonic Delay Lines,* pp 135 and 140, ©1963 Brockelsby et al. Stable waveforms are desirable but for magneostrictive systems, when one secures the coil relative to the magnestrictor, spurious echoes are generated unless special precautions are taken.

Thus, prior art acoustic waveguide systems which produce torsional and/or extensional mode acoustic waves are fairly complex in construction and operation.

BRIEF SUMMARY OF THE INVENTION

It is therefore an object of this invention to provide an acoustic waveguide system which is less complex.

It is a further object of this invention to provide such a system which requires no electromagnetic coils.

It is a further object of this invention to provide such a system which requires no magnetostrictive material.

It is a further object of this invention to provide such a system which is simpler to operate.

It is a further object of this invention to provide such a system which can generate torsional and/or extensional stress wave in solid or hollow rods or tubes made of metal, ceramic, plastic, wood, glass, graphite, or composite materials for non-destructive testing thereof.

It is a further object of this invention to provide such a system which is easy to use and can be quickly coupled to and uncoupled from the "waveguide" being tested or evaluated.

The invention results from the realization that a much simpler acoustic waveguide system is realized by the use of two shear wave transducers coupled on different sides of an axially-elongated waveguide and configured in polarity to launch only one, or more than one type of wave in the waveguide. If the transducers are configured to produce shear stress in a plane perpendicular to the elongated or longitudinal axis of the waveguide, a torsional wave is launched in the waveguide. If the transducers are oriented to couple shear stresses in the direction of the longitudinal axis of the waveguide, an extensional or flexural wave is launched in the waveguide, depending on the stresses being parallel or antiparalell, respectively. It has been observed that the resulting ultrasonic pulse can have a center frequency on the order of 100 kHz when the shear transducers have nominal frequencies on the order of 2 MHz. It has also been observed that angling the transducers (e.g. at 45°), can launch or detect two modes (e.g., torsional and extensional).

This invention features an acoustic waveguide system comprising a waveguide and shear transducers coupled on different sides of the waveguide and configured to launch a wave in the waveguide.

In one embodiment, the opposing transducers are aligned in a direction perpendicular to the longitudinal axis of the waveguide to launch a torsional wave in the waveguide. Also, a longitudinal transducer may be coupled to the proximal end of the waveguide for launching an extensional wave in the waveguide. In another embodiment, the opposing shear transducers are aligned in the direction of the longitudinal axis of the waveguide for launching an extensional wave in the waveguide.

The transducers may be aligned perpendicular to the longitudinal axis of the waveguide and oriented with the same polarity to launch a flexural wave in the waveguide. Or, the transducers may be aligned in the direction of the longitudinal axis of the waveguide and configured with the same polarity to launch an extensional wave in the waveguide. If the transducers are aligned in the direction of the longitudinal axis of the waveguide and configured opposite in polarity, they launch a flexural wave in the waveguide. If the transducers are angled with respect to the longitudinal axis of the waveguide and configured opposite in polarity, they launch both torsional and extensional waves in the waveguide. If the transducers are angled with respect to the longitudinal axis and configured the same in polarity, they launch both flexural and extensional waves in the waveguide.

Typically, the transducers each have a face a portion of which extends outward past the proximal end of the waveguide. There may also be means for conforming the transducers to the shape of the waveguide such as a groove in each transducer for receiving the waveguide or conforming members disposed between each transducer and the waveguide. Each conforming member has one surface with a groove therein for receiving the waveguide.

In one example, the transducers are aligned parallel with the surface of the waveguide but they may also be coupled at an angle with respect to the surface of the waveguide.

Typically, a housing is provided for coupling the transducers to the waveguide. In one embodiment, the housing includes a port in one side thereof for receiving the proximal end of the waveguide and a channel open at the opposing ends of the housing and extending through the housing for receiving the transducers. A pair of members are receivable in the opposing ends of the housing for urging the transducers against the surface of the waveguide. The housing may further include slots in the sides thereof extending inwardly from the open ends of the housing for allowing electrical connections to be made to the transducers. Further included may be a stop member extending through a side of the housing opposite the port for positioning the proximal end of the waveguide with respect to the transducers. In one example, the proximal end of the waveguide includes a threaded orifice and the stop member is threaded into the threaded orifice.

In one example, the waveguide includes a lengthy circular portion and a distal non-circular portion. The distal non-circular portion may be diamond shaped. The transducers are typically diametrically opposed on the surface of the waveguide at the proximal circular portion thereof. In one example, the distal end of the waveguide is placed in a conduit having fluid therein. In other examples, the waveguide is a member such as a long tube to be evaluated and/or tested non-destructively. A guided wave may propagate in the waveguide at a frequency downshifted from the principal natural frequency of the shear wave transducers by a factor of at least five, and preferably by a factor of ten or more.

In the preferred embodiment, the acoustic waveguide system of this invention features a waveguide, and a housing including a port in one side of the housing for receiving the proximal end of the waveguide, the port opening into a channel in the housing. A first shear transducer is located in the channel of the housing and disposed on the waveguide and a second shear transducer is located in the channel and disposed on the opposite side of the waveguide. The first and second shear transducers are configured opposite or the same in polarity and aligned perpendicular to, parallel with, or at an angle with respect to the longitudinal axis of the waveguide to launch a wave in the waveguide.

One acoustic waveguide system in accordance with this invention includes a waveguide, shear transducers coupled on opposite sides of the waveguide and aligned in a direction perpendicular to the longitudinal axis of the wave guide for launching a torsional wave in the waveguide, and a housing for so coupling the transducers to the waveguide.

Another acoustic waveguide system in accordance with this invention features a waveguide, shear transducers disposed on opposite sides of the waveguide and oriented to produce shear waves in the direction of the longitudinal axis of the waveguide for launching an extensional wave in the waveguide, and a housing for coupling the transducers to the waveguide.

In one example, a housing including a port in one side of the housing receives the proximal end of a waveguide, the port opening into channel in the housing, a first shear transducer is located in the channel of the housing and disposed on the surface of the waveguide at the proximal end thereof and oriented to produce shear waves in a direction perpendicular to the longitudinal axis of the waveguide, and a second shear transducer is located in the channel and disposed on the surface of the waveguide at the proximal end thereof opposite the first shear transducer and oriented to produce shear waves in a direction perpendicular to the longitudinal axis of the waveguide. The first and second shear transducers are configured to launch a torsional wave in the waveguide.

In another example, a housing includes a port in one side of the housing for receiving the proximal end of a waveguide, the port opens into a channel in the housing, a first shear transducer is located in the channel of the housing and disposed on the surface of the waveguide at the proximal end thereof and oriented to produce shear waves in the direction of the longitudinal axis of the waveguide, and a second shear transducer is located in the channel of the housing and disposed on the surface of the waveguide at proximal end thereof opposite the first shear transducer and oriented to produce shear waves in the direction of the longitudinal axis of the waveguide. The first and second shear wave producing transducers are configured to launch an extensional wave in the waveguide.

In still another example, a housing includes a port in one side of the housing for receiving the proximal end of the waveguide, the port opening into a channel in the housing, a first shear transducer is located in the channel and disposed on the waveguide, the first transducer having a face a portion of which extends outward past the proximal end of the waveguide, and a second shear transducer is located in the channel and disposed on the opposite side of the waveguide, the second transducer also having a face a portion of which extends outward past the proximal end of the waveguide, the first and second shear transducers configured to launch an acoustic wave in the waveguide.

In all the above examples, the guided wave is downshifted in frequency by about an order of magnitude from the strongest natural resonance frequency and the shear transducers.

BRIEF DESCRIPTION OF THE DRAWINGS

Other objects, features and advantages will occur to those skilled in the art from the following description of a preferred embodiment and the accompanying drawings, in which:

FIG. 17 is a graph showing the return echoes produced during testing of the acoustic waveguide system shown in FIG. 15;

FIG. 18 is a graph showing in more detail a portion of the return echoes depicted in the graph of FIG. 17;

FIG. 19 is a schematic view showing how the acoustic waveguide system of this invention can be used for non-destruction testing purposes;

FIG. 20 is a schematic view showing the use of the acoustic waveguide system of this invention as a density sensor.

DISCLOSURE OF THE PREFERRED EMBODIMENT

Figure 1:
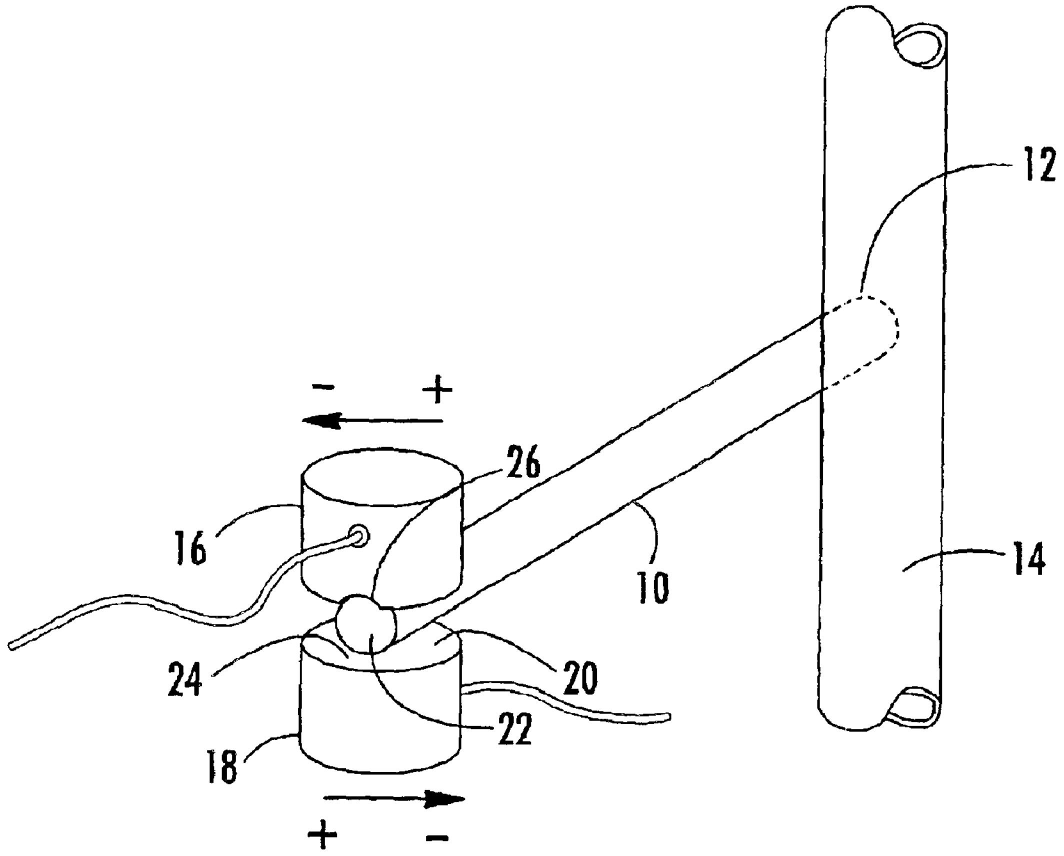
FIG. 1 is a schematic view showing the primary components associated with one acoustic waveguide system in accordance with the subject invention.

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings.

One acoustic waveguide system of the subject invention includes elongated solid elastic or inelastic waveguide 10 typically made of stainless steel with distal end 12 which may be positioned in a fluid-carrying pipe 14 or some other fluid vessel. The waveguide major cross-sectional dimension or diameter is typically ~1 mm to 6.4 mm and length may be from a few centimeters to over 10 m. If tubular waveguides are used, they may have wall thickness from 0.1 mm to several millimeters. As stated in the Background section above, torsional, flexural, and/or extensional mode ultrasonic waves are launched in waveguide 10 and the measured torsional wave sound speed or transit time in a segment of the waveguide is a function of the density, level, viscosity, and temperature of the fluid surrounding the segment. The segment can be remote, i.e., at the distal end of waveguide 10, or in a central or intermediate region. If an extensional wave only is launched in waveguide 10, the transit time between echoes is primarily a function of the temperature of the waveguide segment.

In the prior art, the production of torsional, flexural, or extensional mode ultrasonic waves usually required the use of complex electromagnetic coils and magnetostrictive materials, or special piezoelectric constructions and special electroding arrangements.

In the subject invention, in contrast, two transverse shear transducers 16 and 18 are temporarily or permanently coupled by dry pressure or friction on opposite sides of and at the proximal end of waveguide 10 as shown in FIG. 1 and, in one example, configured opposite in polarity as depicted to launch an acoustic wave in waveguide 10. In one example, shear producing transducers 16 and 18 are GE Panametrics Model No. V154 transducers, excited with a 0.1–0.5 microsecond pulse which ordinarily would produce transverse shear waves at 2.25 MHz. The mode of sound coupling between transducers 16 and 18 and waveguide 10 is dry pressure coupling, which means no viscous or adhesive couplant is required. In FIG. 1, transducers 16 and 18 are oriented on the surface of waveguide 10 to couple tangential shear stresses in the direction shown, in a plane perpendicular to the longitudinal axis of waveguide 10, to thereby produce a torsional wave in waveguide 10. The stress at the transducer/waveguide interface has a sign or "sense" that depends on several factors: piezoelectric cut, the polarity of the electrical excitation pulse (or driving signal), and orientation with respect to the waveguide. The intensity of the wave launched in the waveguide depends on several factors including but not limited to pressure at the interface, and surface or interface conditions (e.g. roughness).

Preferably, each transducer has a face 20 as shown for transducer 18 and the proximal end 22 of waveguide 10 is positioned approximately halfway across face 20 such that portion 24 of face 20 extends outward past proximal end 22 of waveguide 10. Also, a groove, such as groove 26 shown for transducer 16 serves as a means for reproducibly aligning and conforming the transducers to the circumference of the waveguide which, in this example, is round.

Figure 2:
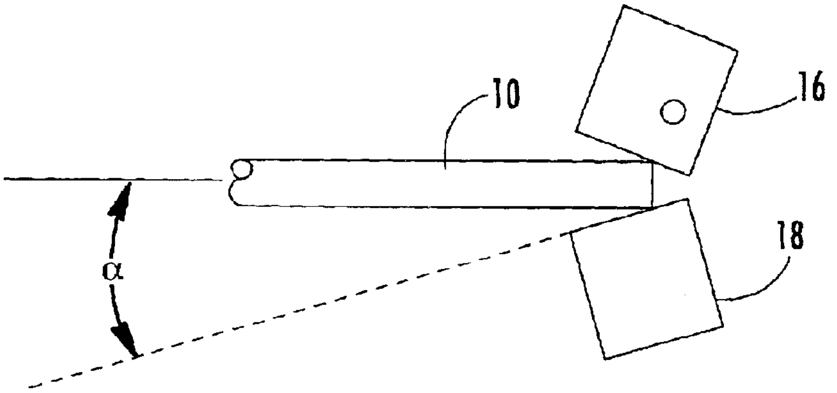
FIG. 2 is a side view showing how the transducers may be angled with respect to the surface of the waveguide in accordance with this invention.
Figure 3:
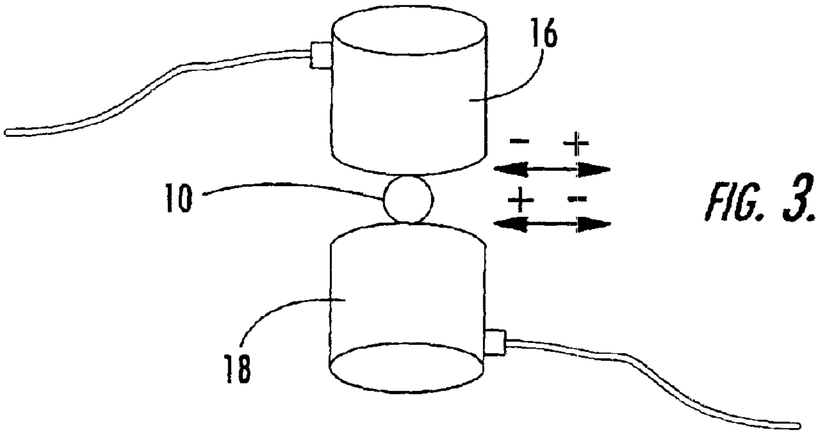
FIG. 3 is a schematic end view of one embodiment of the acoustic waveguide system of the subject invention.

In FIGS. 1 and 3, transducers 16 and 18 are aligned parallel with the surface of waveguide 10, but in FIG. 2 transducers 16 and 18 are aligned at an angle $\alpha$ with respect to the surface of waveguide 10. The angle $\alpha$ may be between 0 degrees (FIG. 1) and two degrees to control or emphasize contact at the very end of the waveguide.

Figure 4:
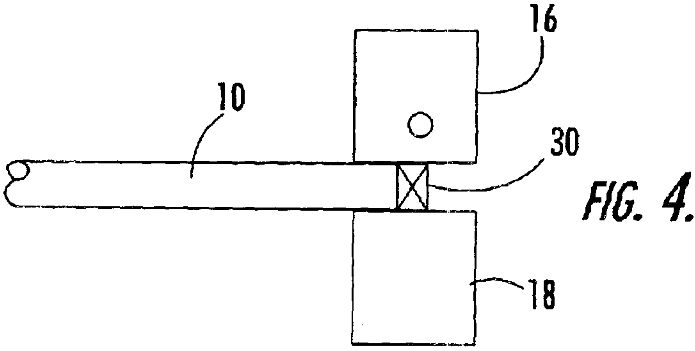
FIG. 4 is a side view showing the addition of an ultrasonic transducer coupled to the proximal end of the waveguide to launch an extensional wave in the waveguide in accordance with the subject invention.

FIG. 4 shows the addition of longitudinal or compressional wave producing transducer 30 coupled to the proximal end of waveguide 10 to thereby launch an extensional wave in waveguide 10. The "longitudinal" producing transducer itself, depending on its damping, terminations, shape, dimensions compared to wavelength, and excitation, may vibrate in thickness, radial, or compound modes.

Figure 5:
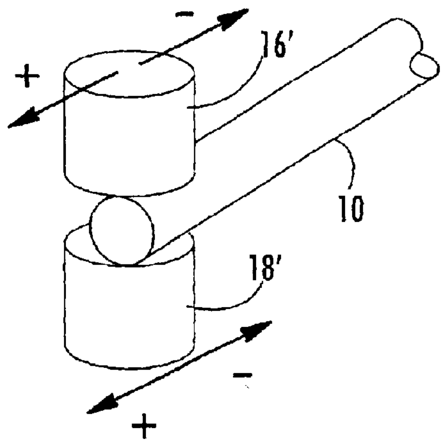
FIG. 5 is a schematic view showing the configuration of the transducers in order to launch an extensional wave in the waveguide in accordance with the subject invention.

Or, as shown in FIG. 5, transducers 16' and 18' with the same polarity are oriented to produce shear stresses in the direction of the longitudinal axis of waveguide 10 to thereby launch an extensional wave in waveguide 10. In fact, the transducers can be oriented to produce shear stresses at different angles with respect to the longitudinal axis of the waveguide to produce different partitions of energy among of waves in the waveguide. Asymmetrical or flexural waves can be produced by coupling the transducers about a line perpendicular to the waveguide. A pair of transducers oriented ±45°, for example, can produce torsion and extension. Thus, it can be seen that the subject invention is highly versatile. The following table provides examples of different embodiments.

TABLE 1

Figure 6:
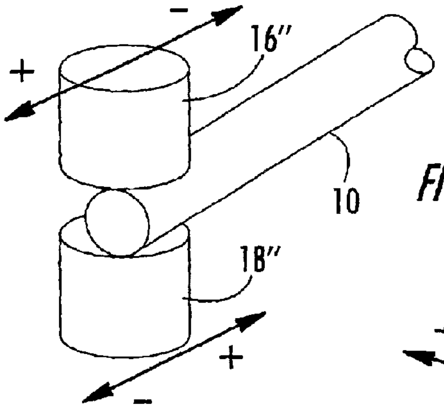
FIG. 6 is a schematic view showing the configuration of the transducers in order to launch a flexural wave in the waveguide in accordance with this invention.
Figure 7:
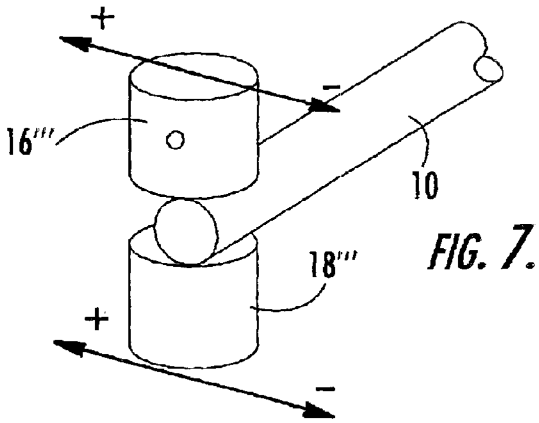
FIG. 7 is a schematic view showing another configuration of the transducers in order to launch a flexural wave in the waveguide in accordance with this invention.
Figure 8:
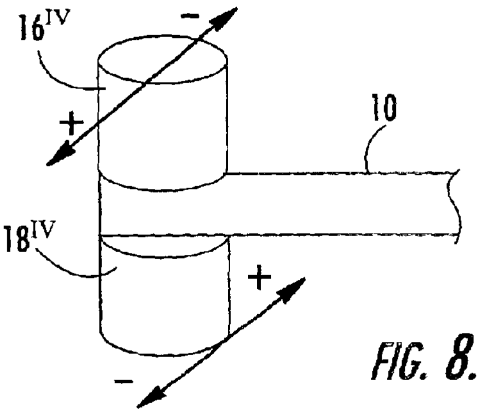
FIG. 8 is a schematic view showing the configuration of the transducers in order to launch torsional and extensional waves in the waveguide.
Figure 9:
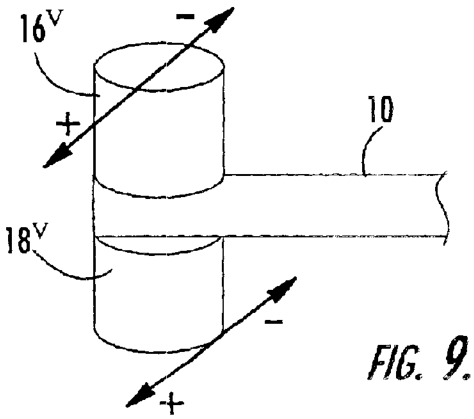
FIG. 9 is a schematic view showing the configuration of the transducers in order to launch flexural and extensional waves in the waveguide.

| Embodiment | Alignment to the longitudinal axis of the waveguide | Polarity | Result |
|---|---|---|---|
| FIG. 1 | Perpendicular | Opposite | Torsional Wave |
| FIG. 7 | Perpendicular | Same | Flexural |
| FIG. 6 | Parallel | Opposite | Flexural |
| FIG. 5 | Parallel | Same | Extensional |
| FIG. 8 | Angled | Opposite | Torsional and extensional waves |
| FIG. 9 | Angled | Same | Flexural and extensional waves |

Again, alignment and polarity (e.g., the configuration) is a function of the piezoelectric cut and the electrical excitation pulse applied to the transducer.

Thus, in FIG. 1, transducers 16 and 18 are aligned perpendicular to the longitudinal axis of the waveguide and configured opposite in polarity to produce a torsional wave in waveguide 10. Transducers 16 and 18 may be configured opposite in polarity by orienting them opposite in polarity and driving them with the same drive signal or by orienting them with the same directional polarity and driving them with two different drive signals such that one receives an up or positive-going pulse at the same time the other receives a down or negative-going pulse.

The particle displacement in a shear wave piezoelectric crystal such as X-cut quartz depends on several factors. These include the physical orientation of the crystal axes, and the sign of the electrical driving voltage. Typically such crystals are manufactured with a small notch in one corner to identify on a macroscopic scale, readily visible, the crystallographic orientation. For consistency, packaged commercial transducer assemblies may bond a “north”—orientated rectangular shear crystal within a housing such that the notch is on the “northeast” corner. Rotating the rectangle 180° to the opposite location (southwest) would reverse the sign of the displacement, i.e., the initial direction of motion or stress in response to a positive-going electrical impulse. We refer to the combination of physical and electrical polarizations and orientations that contribute to the resultant particle displacement’s initial direction, as “configuration”. The transducer is further characterized by the center frequency of the ultrasonic pulse that is launched when the device is energized by a short electrical impulse, or by a square pulse whose width is adjusted until the resulting stress has a maximum value. As a numerical example, a square pulse having a width of 0.5 microseconds would correspond to a 2-MHz ultrasonic wave. If such a transducer is coupled to a solid elastic object such as a steel bar having cross sectional dimensions comparable to or larger then the transducer, a 2 MHz pulse or 2 MHz shear wave will propagate into the object.

When a pair of such crystals, or a pair of encapsulated shear wave transducer assemblies such as the aforementioned Panametrics transducer, are coupled to opposite sides of an acoustic waveguide, and excited electrically, shear stresses are imparted (coupled) to the waveguide. But how the wave the propagates depends on the stresses being of like or unlike sign, and further, on the orientation of the stress with respect to the waveguide axis. In the example above, they are located on opposite sides of a round rod waveguide (of material 316SS, glass, ceramic, etc.) such that the stresses produce a torque in a plane perpendicular to the waveguide axis, launching an ultrasonic torsional wave that propagates without dispersion, so long as the rod radius is much less than the wavelength of the propagating torsional wave. In addition, we have found that if the waveguide cross sectional dimensions or wall thickness are less than about one cm and preferably less than 6.4 mm, the waveguide acts as a low pass filter and in effect downshifts the ultrasonic frequency by over an order of magnitude. The amount of downshift depends in part on how much of the proximal end of the waveguide is engaged by the shear transducers. It appears that downshifting can reduce the propagating frequency by a factor of at least five and perhaps as much as a factor of twenty, based on tests conducted to date.

This means, starting with so-called 2-MHz shear transducers (meaning, their principal resonant frequency is 2 MHz), and receiving echoes or transmissions with 2-MHz shear transducers, the frequency observed is in the 100-kHz to 200-kHz range. This unexpected downshifted-frequency result is extremely useful. It allows waveguides and portions of waveguides to be used as sensors to determine density, temperature or viscosity of fluids, particularly liquids, into which the sensor or waveguide is immersed. It also means that a one foot long straight solid 316SS rod, for example, can be machined in a 100-mm (4-inch long) central portion to a cusped or flat-faced diamond cross section, radiused to 0.1-mm at leading and trailing edges, yielding an aspect ratio of 3:1, radiused with 1-mm radii at the transitions, such that the cross sectional dimensions are all much less then the wavelength at the propagating frequency of 100 kHz, even though the transducers at both ends are fundamentally resonant near 2 MHz or 2.25 MHz. We have found that when such a central-sensor diamond is immersed in water, the transit time for the guided torsional waves increases by over 6 microseconds. Resolving this delta t to 6 nanoseconds corresponds to density sensitivity of 0.1%. In another waveguide design, the 316SS rod, of same starting dimensions, when machined to a cusped diamond at the last inch, and tested in pulse-echo mode, yielded about the same delta t when immersed in water, compared to readings in air.

In FIG. 5, transducers 16' and 18' are aligned parallel to the longitudinal axis of the waveguide and configured to have the same polarity to produce an extensional wave in waveguide 10. In FIG. 6, by aligning transducers 16" and 18" parallel with the longitudinal axis of waveguide 10 but, by configuring them opposite in polarity, a flexural wave is provided in waveguide 10. The same result is obtained by aligning transducers 16'" and 18'", FIG. 7, perpendicular to the longitudinal axis of the waveguide and configuring them to have the same polarity.

In FIG. 8, transducers $\mathbf{16}^{IV}$ and $\mathbf{18}^{IV}$ are aligned at an angle (e.g., 45°) to the longitudinal axis of the waveguide and configured opposite in polarity to produce both torsional and extensional waves in waveguide 10. To produce both flexural and extensional waves in waveguide 10, FIG. 9, transducers $\mathbf{16}^{V}$ and $\mathbf{18}^{V}$ are aligned at an angle with respect to the longitudinal axis of waveguide 10 and configured to have the same polarity. As shown in table 1, each shear transducer can be rotated about its own axis to impart stress to the acoustic waveguide at any preselectable angle to the longitudinal axis of the waveguide. For simplicity, let us consider only angles in increments of 45°. In radian notation, we then have possible angles of n pi/4 and m pi/4 where m and n are integers from zero to 7, and n may or may not equal m. If m=n=zero, extensional waves are generated in the waveguide. If m=2 and m=6, a torque is applied in a plane perpendicular to the waveguide axis and torsional waves are generated in the waveguide. Other combinations of angles generate flexure alone or, for example, extensional and torsional waves.

Figure 10:
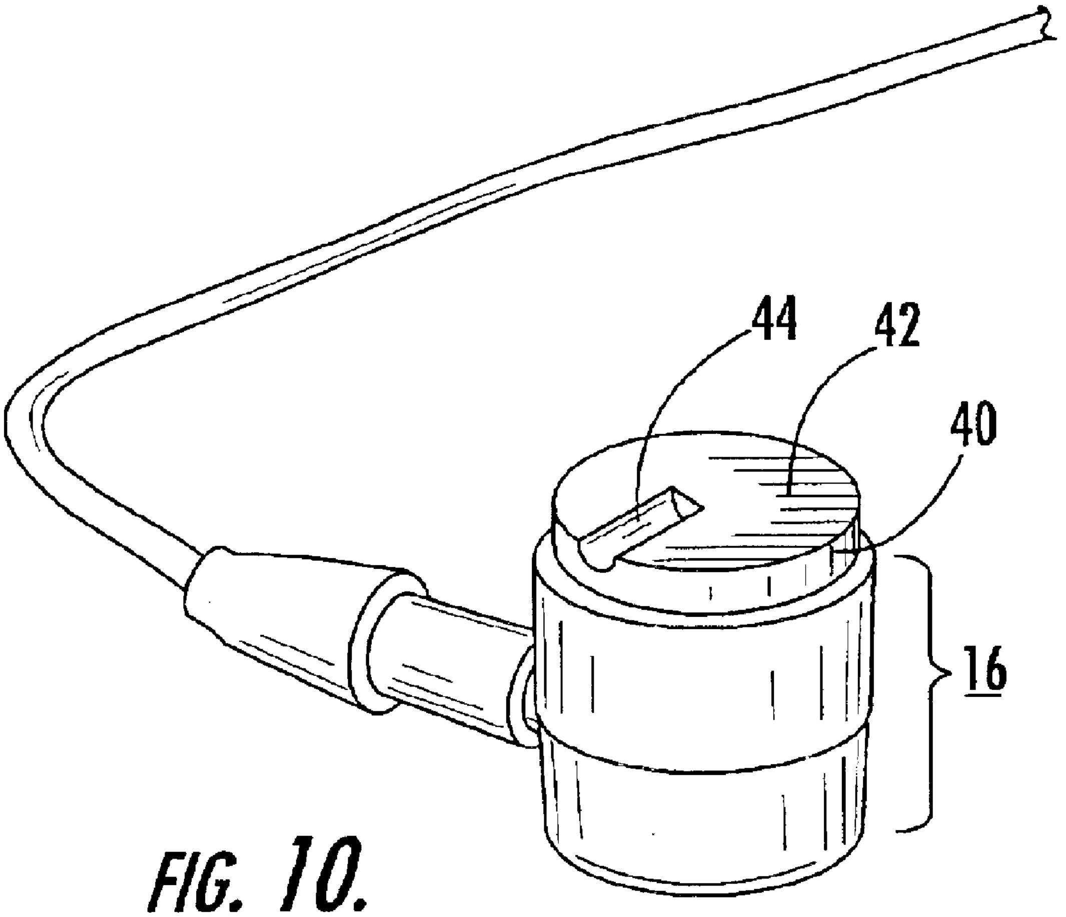
FIG. 10 is a three-dimensional schematic view showing a single transducer and a waveguide conforming member in accordance with the subject invention.

FIG. 10 shows the addition of conforming member 40 adhered to transducer 16 and including surface 42 with groove 44 therein serving as a means for conforming transducer 16 to the shape of the waveguide.

Figure 11:
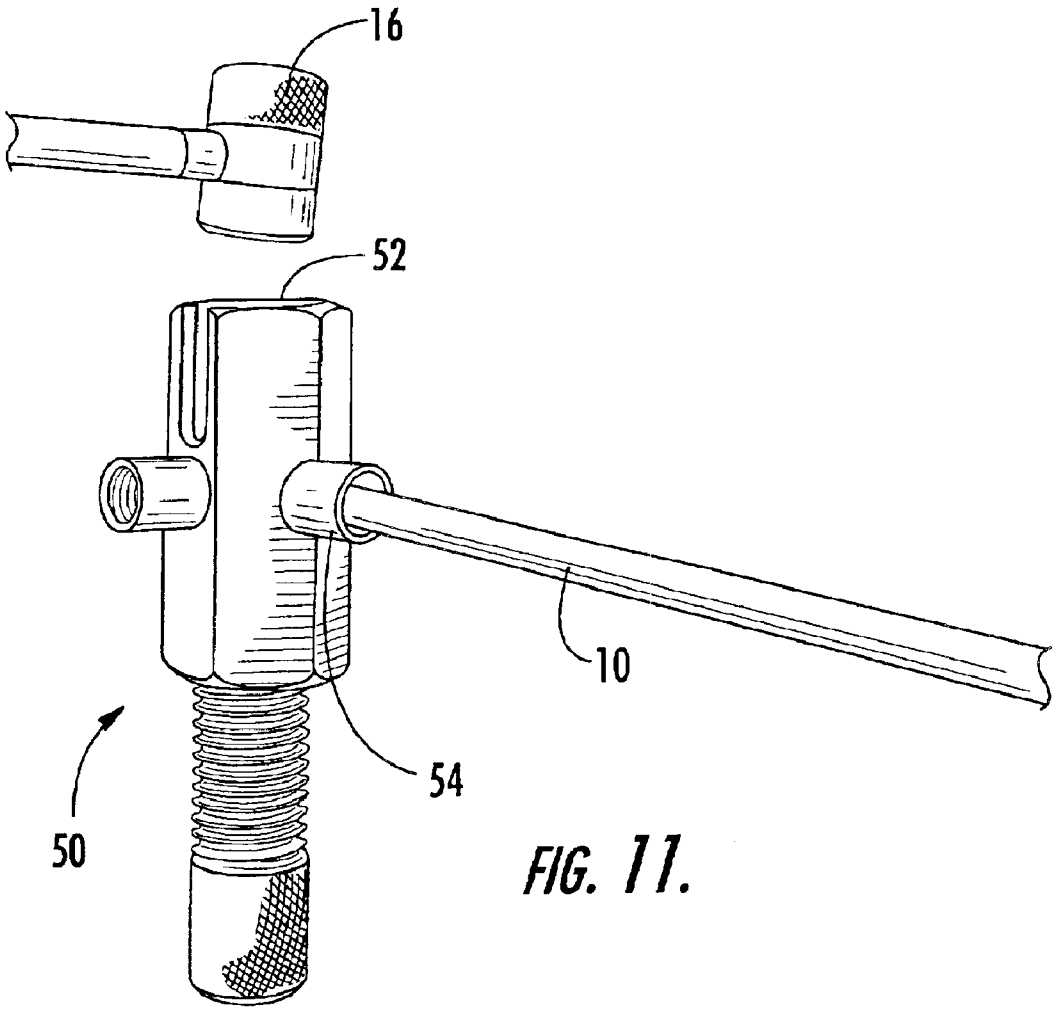
FIG. 11 is a schematic three-dimensional side view showing the acoustic waveguide system housing of this invention just before one of the transducers is assembled therewith.
Figure 12:
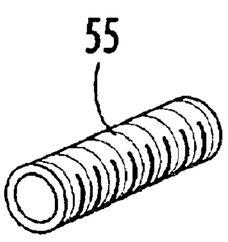
FIG. 12 is a schematic view of a centering member for the housing of FIG. 11.
Figure 13:
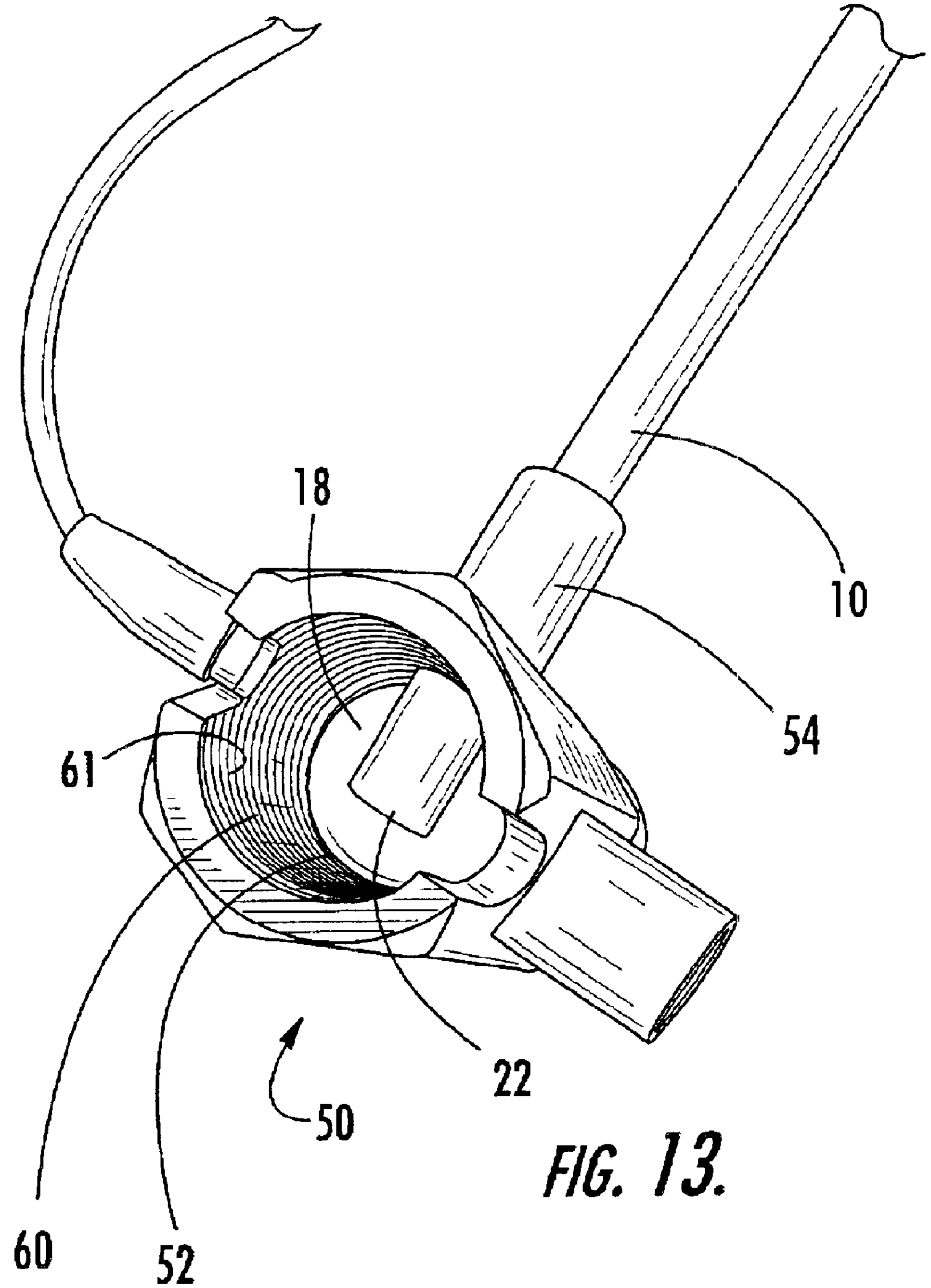
FIG. 13 is a schematic three-dimensional top view showing one transducer already in place in the housing and the waveguide positioned in the port of the housing.
Figure 14:
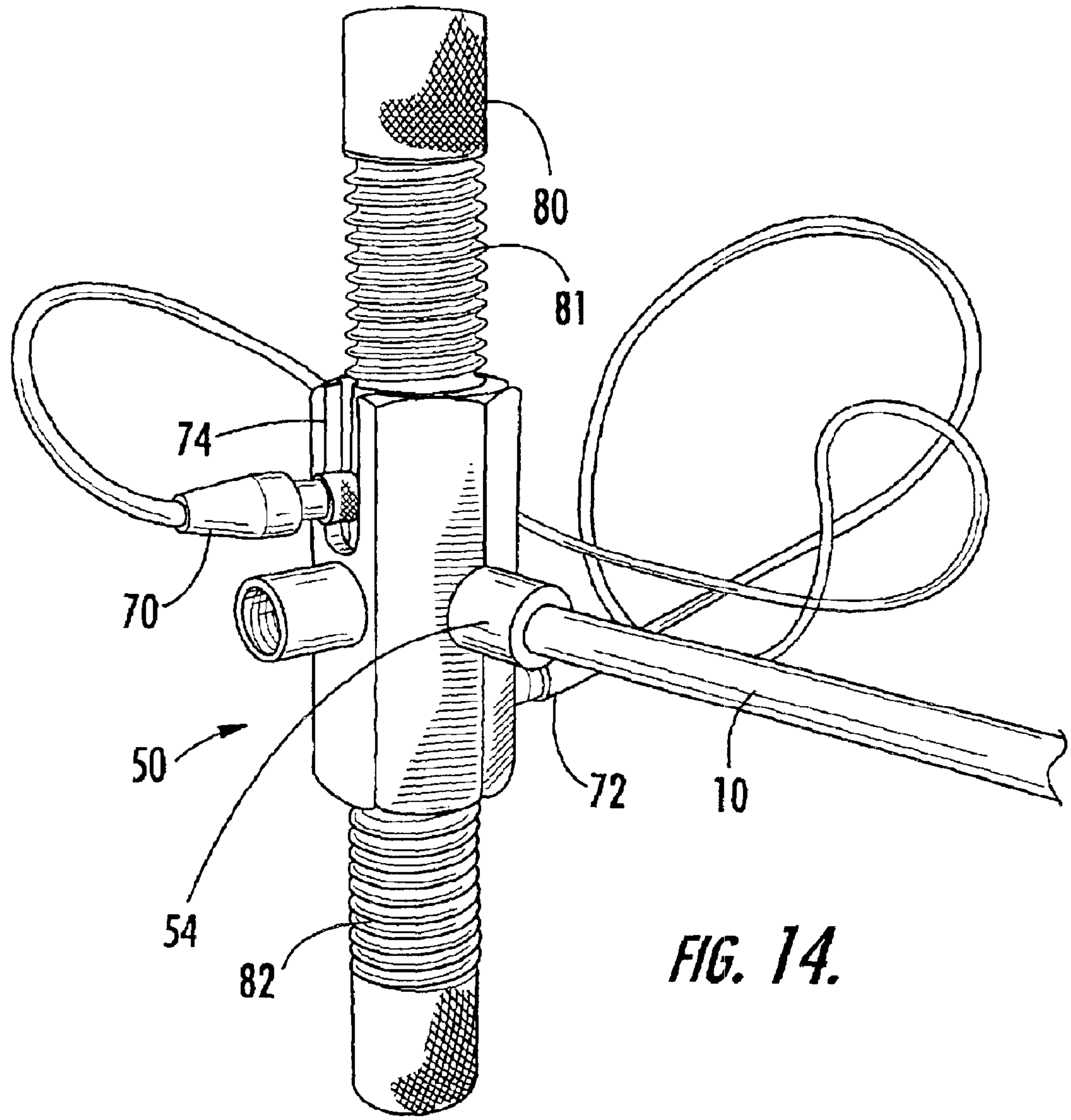
FIG. 14 is a schematic three-dimensional view showing a complete acoustic waveguide system in accordance with the subject invention.
Figure 15:
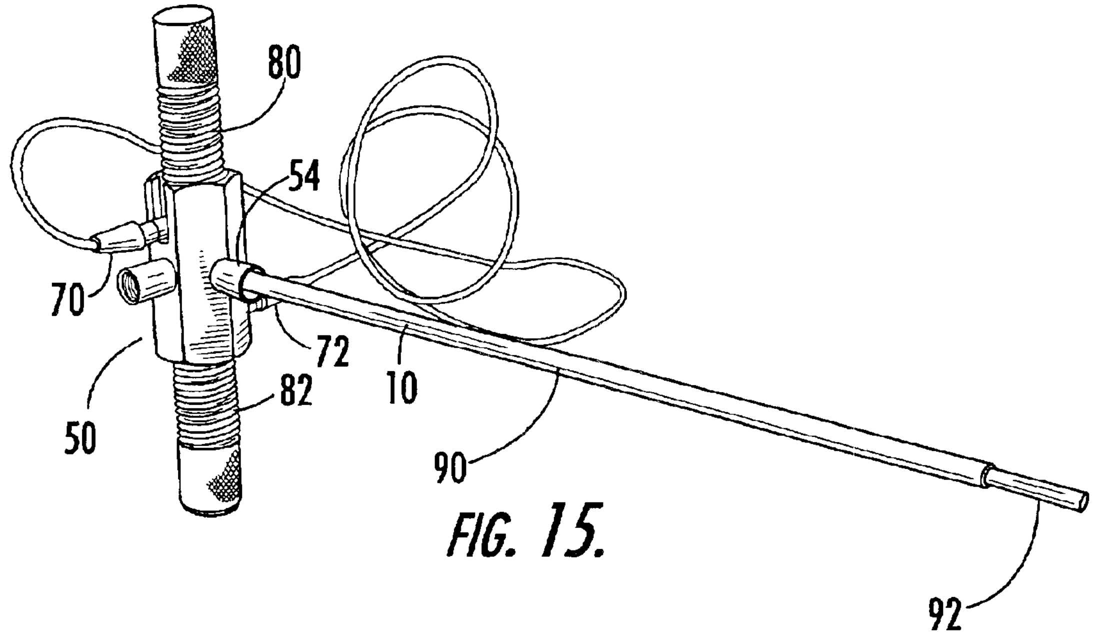
FIG. 15 is similar to FIG. 14 but also showing a non-circular shaped distal end of the waveguide in accordance with the subject invention.

Housing 50, FIG. 11 may be provided for coupling the transducers to the opposing surfaces of waveguide 10 in a diametrically opposing manner. Transducer 16 is shown just before it is placed in the open end 52 of housing 50 and waveguide 10 is shown disposed in port 54 midway in the side of housing 50. FIG. 12 shows threaded plastic insert 55 which may be used to receive the distal end of waveguide 10 and which itself is threaded into port 54 to center and non-reflectively support waveguide 10. FIG. 13 shows transducer 18 already in place in the other end of housing 50 in channel 60 which extends through housing 50 for receiving both transducers. Port 54 opens into channel 60 for positioning waveguide 10 with respect to the faces of the transducers. In FIG. 14, both transducers are shown in place with their electrical connections 70 and 72 extending through slots (see slot 74) in the sides of housing 50 extending from the open ends of the housing inwardly. Fasteners 80 and 82 are threaded into the opposing open ends of housing 50 after the transducers are placed therein for urging the transducers against the circumferential surface of the waveguide. FIG. 13 shows internal threads 61 of channel 60 which mate with external threads 81 of fastener 80, FIG. 14. Typically, most of all of the components of housing 50 are made of stainless steel. However, a plastic or rubber tube may be used to non-reflectively support the waveguide where it exits from the metallic housing as discussed above with reference to FIG. 12. FIG. 15 shows that waveguide 10 may comprise an elongated or lengthy intermediate circular lead-in portion 90 and distal ("remote") non-circular diamond shaped sensor portion 92.

Figure 16:
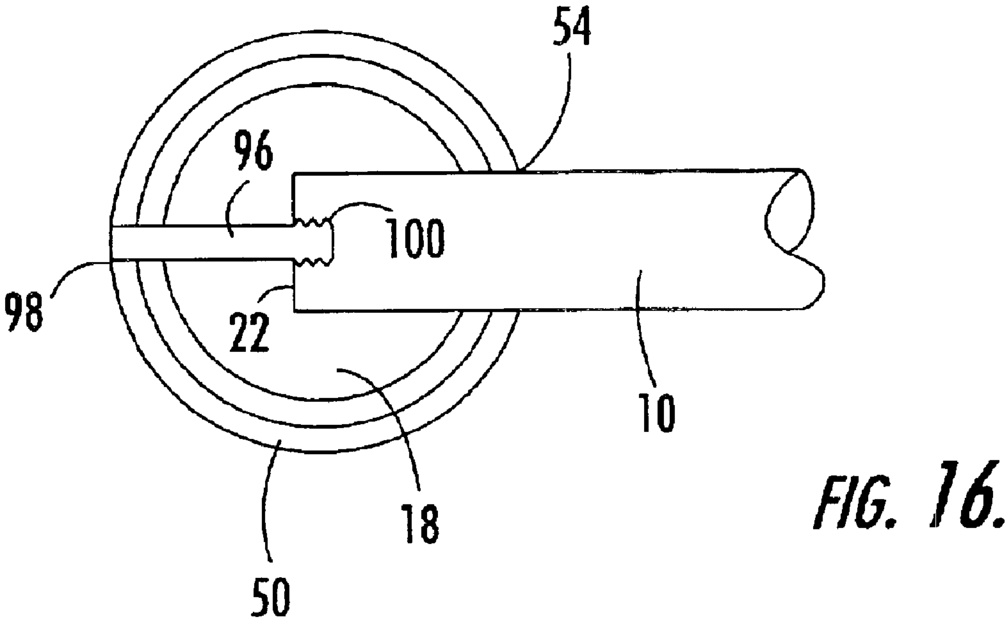
FIG. 16 is a cross-sectional view showing a stop member for properly positioning the proximal end of the waveguide with respect to the transducers in accordance with the subject invention.

Preferably, stop member 96, FIG. 16 extends through side 98 of housing 50 opposite port 54 for positioning the proximal end 22 of waveguide 10 part-way, e.g., halfway across the face of transducer 18. Typically, proximal end 22 of waveguide 10 includes threaded orifice 100 therein and stop member 96 is threaded into orifice 100 to its full extent.

The diamond-shaped sensor portion of FIG. 15 was tested in water at room temperature with a waveguide lead-in 0.25 inches in diameter and approximately 12 inches long. The shear transducers are of nominal frequency 2.25 MHz. Pulse 200, FIGS. 17 and 18, is the excitation pulse. Echo 202 was reflected from the transition of the waveguide between the round portion and the non-circular cross-sectional portion and pulse 204 was reflected from the distal end of the waveguide. The times between specified zero crossings of pulses 202 and 204 are measured and are called t and $t_0$, corresponding to transit times when the waveguide immersed in a liquid versus in air or vacuum. The time difference $\Delta t = t - t_0$ is used (as known in the art) to calculate fluid density, temperature, viscosity, and/or the height of the fluid after suitable calibration.

Thus, the acoustic waveguide system of the subject invention is far less complex than prior art systems, allows the connection of transducers to a waveguide to be made or removed quickly, is not limited to a narrow class of waveguide materials, requires no electromagnetic coils or magnetostrictive material, and is much simpler to operate, design, and manufacture. Shear transducers are coupled on different sides of the waveguide tangentially to the circumference of the waveguide and excited, oriented, and configured (parallel versus antiparallel e.g.) to launch one or more different types of guided acoustic waves in the waveguide. If the transducers, located at the proximal end of a waveguide, are oriented to produce a shear stresses in a plane perpendicular to the longitudinal axis of the waveguide, a torsional wave is launched in the waveguide. If the same transducers are oriented to produce symmetrical shear stresses in the direction of the longitudinal axis of the waveguide, an extensional wave is launched in the waveguide. Reversing one transducer produces asymmetrical stresses to launch flexural waves. Intermediate angulation achieves energy partition among multimodes, to respond to multi-parameters such as density, temperature, or viscosity.

In FIG. 19, "waveguide" 10' is a thin walled tube and transducers 16 and 18 are shown coupled thereto at the end and aligned and configured as desired using Table 1 above to determine the length of tube 10' or to detect whether tube 10' has defects that one of the interrogating modes can detect.

In one particular example, in order to measure the density of fluid flowing in conduit 304, transducers 16 and 18, FIG. 20, are coupled to waveguide 10 as discussed above with respect to FIG. 1 to launch a torsional wave in waveguide 10 which extends through conduit 304 as shown and transducers 300 and 302 serve as the receiving transducers on the opposite end of waveguide 10. In still another example, the arrangement of FIG. 20 is used as a thermometer and waveguide 10 need not even be disposed in conduit 304.

Figure 21:
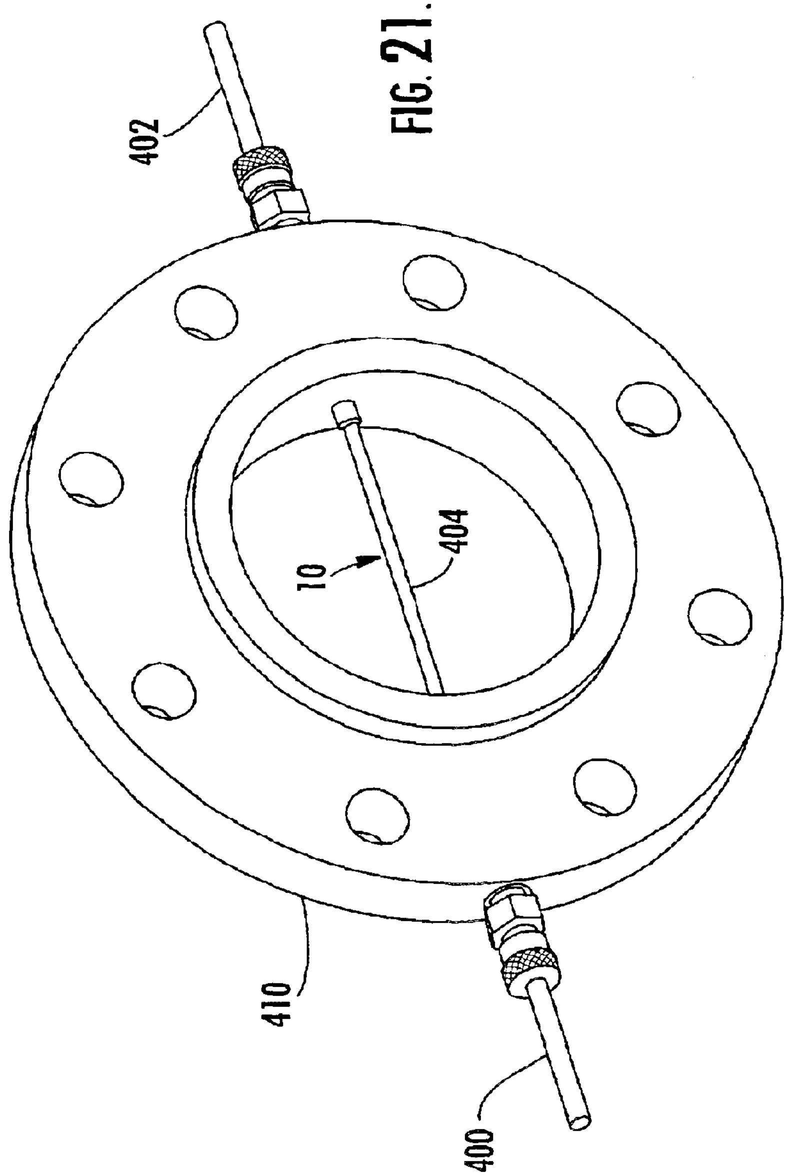
FIGS. 21–24 are schematic views showing the use of a waveguide in accordance with this invention in connection with a housing coupled to a conduit containing a flow therein.
Figure 22:
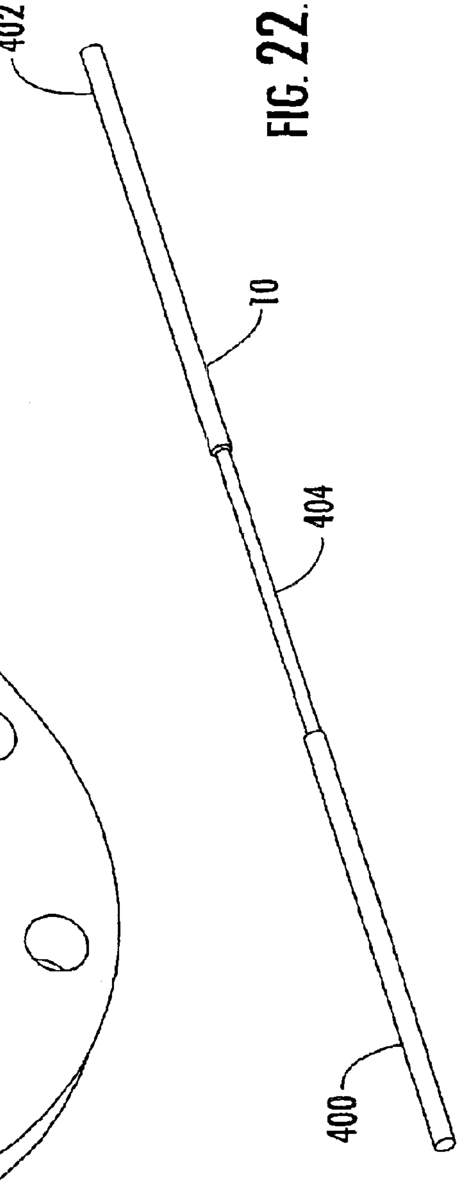
Figure 23:
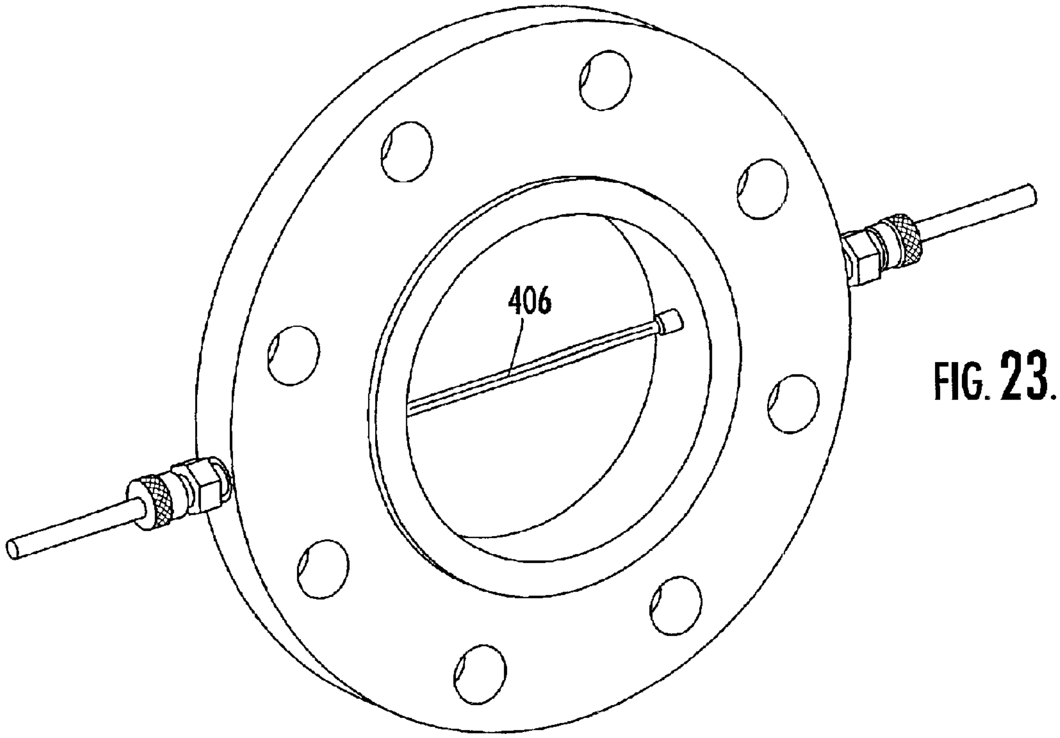
Figure 24:
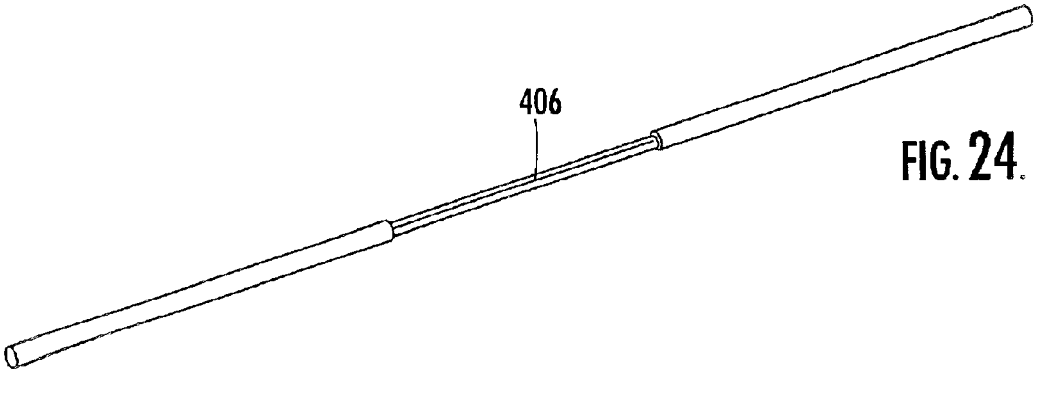

The unique transducer arrangement of this invention makes it possible to test various arrangements quickly and easily. In most of laboratory tests to date, we dry-friction-coupled the shear stresses to one or both ends of the waveguide with finger-tight pressures, but without any adhesive, without any viscous water-soluble couplant such as honey, without thermosetting agents such as Salol, and without quick-setting or other epoxies, but such bonding methods, well known in the art, can also be used, especially if one does not wish to rely on dry coupling by friction alone. The small size of the shear transducers and their placement at proximal or both ends of the waveguide, means the overall acoustic waveguide can be short, say one ft (300 mm) and one-third of that length can be devoted to sensing in a central sensor section. The lead-in and lead-out sections can be shorter in principle than 100 mm, but ~100-mm lead-in and lead-out lengths are useful for mounting radially between bolt holes in flanges. The advantage of short lead-in and lead-out segments is that they do not protrude excessively from a pipe or spoolpiece. hi this numerical example, the ratio of the overall waveguide length to length of the central sensor section is 3:1. FIGS. 21 and 22, for example, show lead-in 400 and lead-out 402 segments for waveguide 10 and central round sensor section 404 and FIGS. 23–24 show diamond shaped central section 406. The transducers, configured as designed from the example of Table 1, are coupled to lead-in section 400 for producing the desired wave mode and similarly configured transducers are coupled to the lead-out section to detect the transit time of the resulting echo. Housing 410 is provided to locate this sensor arrangement with respect to a conduit section having a flow therein. Housing 50, FIGS. 11–15 may be used to couple the transducers to lead-in 400 and lead-out 402 segments of waveguide 10.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments.

Other embodiments will occur to those skilled in the art and are within the following claims:

What is claimed is:

1. An acoustic waveguide system comprising:

a waveguide; and shear wave transducers coupled on different sides of the waveguide, each shear wave transducer having a face, a portion of each face extending outward past an end of the waveguide, each shear wave transducer configured in polarity to launch a guided wave in the waveguide.

2. The system of claim 1 in which the transducers are aligned perpendicular to a longitudinal axis of the waveguide and oriented opposite in polarity to launch a torsional wave in the waveguide.

3. The system of claim 2 further including a longitudinal transducer coupled to the proximal end of the waveguide for launching an extensional wave in the waveguide.

4. The system of claim 1 in which the transducers are aligned perpendicular to the longitudinal axis of the waveguide and oriented with the same polarity to launch a flexural wave in the waveguide.

5. The system of claim 1 in which the transducers are aligned in the direction of the longitudinal axis of the waveguide and configured with the same polarity to launch an extensional wave in the waveguide.

6. The system of claim 1 in which the transducers are aligned in the direction of the longitudinal axis of the waveguide and configured opposite in polarity to launch a flexural wave in the waveguide.

7. The system of claim 1 in which the transducers are aligned at an angle with respect to the longitudinal axis of the waveguide and configured opposite in polarity to launch both torsional and extensional waves in the waveguide.

8. The system of claim 1 in which the transducers are aligned at an angle with respect to the longitudinal axis and configured the same in polarity to launch both flexural and extensional waves in the waveguide.

9. The system of claim 1 further including means for conforming the transducers to the shape of the waveguide.

10. The system of claim 9 in which said means includes a groove in each transducer for receiving the waveguide.

11. The system of claim 9 in which said means includes a conforming member disposed between each transducer and the waveguide.

12. The system of claim 11 in which the conforming member has one surface with a groove therein for receiving the waveguide.

13. The system of claim 1 in which the transducers are coupled parallel to the surface of the waveguide.

14. The system of claim 1 in which the transducers are coupled at an angle with respect to the surface of the waveguide.

15. The system of claim 1 further including a housing for coupling the transducers to the waveguide.

16. The system of claim 15 in which the housing includes a port in one side thereof for receiving a proximal end of the waveguide and a channel open at opposing ends of the housing and extending through the housing for receiving the transducers.

17. The system of claim 16 further including a pair of members receivable in the opposing ends of the housing for urging the transducers against the waveguide.

18. The system of claim 16 in which the housing further includes slots in the sides thereof extending inwardly from open ends of the housing for allowing electrical connections to be made to the transducers.

19. The system of claim 16 further including a stop member extending through a side of the housing opposite the port for positioning the proximal end of the waveguide with respect to the transducers.

20. The system of claim 19 in which the proximal end of the waveguide includes a threaded orifice and the stop member is threaded into the threaded orifice.

21. The system of claim 1 in which the waveguide includes a lengthy circular portion and a distal non-circular portion.

22. The system of claim 21 in which the distal non-circular portion is diamond shaped.

23. The system of claim 1 in which the transducers are diametrically opposed on the waveguide.

24. The system of claim 1 in which a distal end of the waveguide is placed in a conduit having fluid therein.

25. The system of claim 1 in which the waveguide extends through a conduit having fluid therein.

26. The system of claim 1 in which the waveguide is a member to be evaluated.

27. The system of claim 1 wherein a guided wave propagates in the waveguide at a frequency downshifted from a principal natural frequency of the shear wave transducers by a factor of at least five.

28. The system of claim 1 wherein a guided wave propagates in the waveguide at a frequency downshifted from a principal natural frequency of the shear wave transducers by a factor of ten.

29. The system of claim 1 wherein a guided wave propagates in the waveguide at a frequency downshifted from a principal natural frequency of the shear wave transducers by a factor greater than 10.

30. An acoustic waveguide system comprising:

a waveguide;

a housing including a port in one side of the housing for receiving a proximal end of the waveguide, the port opening into a channel in the housing;

a first shear transducer located in the channel of the housing and disposed on the waveguide; and a second shear transducer located in the channel and disposed on the opposite side of the waveguide, the first and second shear transducers configured to launch a wave in the waveguide.

31. The system of claim 30 in which the opposing transducers are aligned in a direction perpendicular to a longitudinal axis of the waveguide.

32. The system of claim 31 in which the transducers are configured opposite in polarity to launch a torsional wave in the waveguide.

33. The system of claim 31 in which the transducers are configured with the same polarity to launch a flexural wave in the waveguide.

34. The system of claim 30 in which the opposing transducers are aligned in the direction of the longitudinal axis of the waveguide.

35. The system of claim 34 in which the transducers are configured opposite in polarity to launch a flexural wave in the waveguide.

36. The system of claim 34 in which the transducers are configured the same in polarity to launch an extensional wave in the waveguide.

37. The system of claim 30 further including means for conforming the transducers to the shape of the waveguide.

38. The system of claim 37 in which said means includes a conforming member disposed between each transducer and the waveguide.

39. The system of claim 38 in which the conforming member has one surface with a groove therein for receiving the waveguide.

40. The system of claim 30 in which the transducers are aligned parallel with the surface of the waveguide.

41. The system of claim 30 further including a pair of members each extending in the channel of the housing and each urging a transducer against the surface of the waveguide.

42. The system of claim 30 further including a stop member extending through a side of the housing opposite the port for positioning the proximal end of the waveguide with respect to the transducers.

43. The system of claim 42 in which the proximal end of the waveguide includes a threaded orifice and the stop member is threaded into the threaded orifice.

44. The system of claim 30 in which the waveguide includes a lengthy circular portion and a distal non-circular portion.

45. The system of claim 44 in which the distal non-circular portion is diamond shaped.

46. The system of claim 30 in which the shear wave transducers are diametrically opposed on the waveguide.

47. An acoustic waveguide system comprising:

a waveguide;

shear transducers coupled on opposite sides of the waveguide and oriented to produce shear waves in a direction perpendicular to a longitudinal axis of the waveguide for launching a torsional wave in the waveguide; and a housing for coupling the shear transducers to the waveguide.

48. An acoustic waveguide system comprising:

a waveguide;

shear transducers disposed on different sides of the waveguide, each transducer having a face, a portion of which extends outward past a proximal end of the waveguide, the transducers configured in polarity to launch a wave in the waveguide; and a housing for coupling transducers to the waveguide.

49. An acoustic waveguide system comprising:

a waveguide;

shear transducers disposed on opposite sides of the waveguide and oriented to produce shear waves in the direction of the longitudinal axis of the waveguide for launching an extensional wave in the waveguide; and a housing for coupling the transducers to the waveguide.

50. An acoustic waveguide system comprising:

a waveguide;

a housing including a port in one side of the housing for receiving a proximal end of the waveguide, the port opening into a channel in the housing;

a first shear transducer located in the channel of the housing and disposed on the surface of the waveguide at the proximal end thereof and aligned in a direction perpendicular to a longitudinal axis of the waveguide; and a second shear transducer located in the channel and disposed on the surface of the waveguide at the proximal end thereof opposite the first shear wave transducer and aligned in a direction perpendicular to the longitudinal axis of the waveguide, the first and second shear wave transducers configured to launch a torsional wave in the waveguide.

51. An acoustic waveguide system comprising:

a waveguide;

a housing including a port in one side of the housing for receiving the proximal end of the waveguide, the port opening into a channel in the housing;

a first shear transducer located in the channel of the housing and disposed on the surface of the waveguide at the proximal end thereof and aligned in the direction of the longitudinal axis of the waveguide; and a second shear transducer located in the channel of the housing and disposed on the surface of the waveguide at the proximal end thereof opposite the first shear wave producing transducer and aligned in the direction of the longitudinal axis of the waveguide, the first and second shear wave producing transducers configured to launch an extensional wave in the waveguide.

52. An acoustic waveguide system comprising:

a waveguide;

a housing including a port in one side of the housing for receiving a proximal end of the waveguide, the port opening into a channel in the housing;

a first shear transducer located in the channel and disposed on the waveguide, the first transducer having a face, a portion of which extends outward past the proximal end of the waveguide; and a second shear transducer located in the channel and disposed on the opposite side of the waveguide, the second transducer also having a face a portion of which extends outward past the proximal end of the waveguide, the first and second transducers configured to launch an acoustic wave in the waveguide.

53. The system of claim 52 wherein a guided wave propagates in the waveguide at a frequency downshifted from a principal natural frequency of the shear wave transducers by a factor of at least five.

54. The system of claim 52 wherein a guided wave propagates in the waveguide at a frequency downshifted from a principal natural frequency of the shear wave transducers by a factor of ten.

55. The system of claim 52 wherein a guided wave propagates in the waveguide at a frequency downshifted from a principal natural frequency of the shear wave transducers by a factor greater then 10.

56. An acoustic waveguide system comprising:

a waveguide; and shear wave transducers coupled on different sides of the waveguide, each shear wave transducer having a face, a portion of each face contacting an end of the waveguide, each shear wave transducer configured in polarity to launch a guided wave in the waveguide.

57. The system of claim 56 in which the transducers are aligned perpendicular to a longitudinal axis of the waveguide and oriented opposite in polarity to launch a torsional wave in the waveguide.

58. The system of claim 57 further including a longitudinal transducer coupled to a proximal end of the waveguide for launching an extensional wave in the waveguide.

59. The system of claim 56 in which the transducers are aligned perpendicular to a longitudinal axis of the waveguide and oriented with the same polarity to launch a flexural wave in the waveguide.

60. The system of claim 56 in which the transducers are aligned in the direction of a longitudinal axis of the waveguide and configured with the same polarity to launch an extensional wave in the waveguide.

61. The system of claim 56 in which the transducers are aligned in the direction of a longitudinal axis of the waveguide and configured opposite in polarity to launch a flexural wave in the waveguide.

62. The system of claim 56 in which the transducers are aligned at an angle with respect to a longitudinal axis of the waveguide and configured opposite in polarity to launch both torsional and extensional waves in the waveguide.

63. The system of claim 56 in which the transducers are aligned at an angle with respect to a longitudinal axis and configured the same in polarity to launch both flexural and extensional waves in the waveguide.

64. The system of claim 56 further including means for conforming the transducers to the shape of the waveguide.

65. The system of claim 64 in which said means includes a groove in each transducer for receiving the waveguide.

66. The system of claim 64 in which said means includes a conforming member disposed between each transducer and the waveguide.

67. The system of claim 66 in which the conforming member has one surface with a groove therein for receiving the waveguide.

68. The system of claim 56 in which the transducers are coupled parallel to the surface of the waveguide.

69. The system of claim 56 in which the transducers are coupled at an angle with respect to the surface of the waveguide.

70. The system of claim 56 further including a housing for coupling the transducers to the waveguide.

71. The system of claim 70 in which the housing includes a port in one side thereof for receiving a proximal end of the waveguide and a channel open at opposing ends of the housing and extending through the housing for receiving the transducers.

72. The system of claim 71 further including a pair of members receivable in opposing ends of the housing for urging the transducers against the waveguide.

73. The system of claim 71 in which the housing further includes slots in the sides thereof extending inwardly from open ends of the housing for allowing electrical connections to be made to the transducers.

74. The system of claim 71 further including a stop member extending through a side of the housing opposite the port for positioning the proximal end of the waveguide with respect to the transducers.

75. The system of claim 74 in which the proximal end of the waveguide includes a threaded orifice and the stop member is threaded into the threaded orifice.

76. The system of claim 56 in which the waveguide includes a lengthy circular portion and a distal non-circular portion.

77. The system of claim 76 in which the distal non-circular portion is diamond shaped.

78. The system of claim 56 in which the transducers are diametrically opposed on the waveguide.

79. The system of claim 56 in which a distal end of the waveguide is placed in a conduit having fluid therein.

80. The system of claim 56 in which the waveguide extends through a conduit having fluid therein.

81. The system of claim 56 in which the waveguide is a member to be evaluated.

82. The system of claim 56 wherein a guided wave propagates in the waveguide at a frequency downshifted from a principal natural frequency of the shear wave transducers by a factor of at least five.

83. The system of claim 56 wherein a guided wave propagates in the waveguide at a frequency downshifted from a principal natural frequency of the shear wave transducers by a factor of ten.

84. The system of claim 56 wherein a guided wave propagates in the waveguide at a frequency downshifted from a principal natural frequency of the shear wave transducers by a factor greater than 10.

* * * * *

UNITED STATES PATENT AND TRADEMARK OFFICE

CERTIFICATE OF CORRECTION

PATENT NO. : 6,889,552 B2 Page 1 of 1
DATED : May 10, 2005
INVENTOR(S) : Toan H. Nguyen and Lawrence C. Lynnworth It is certified that error appears in the above-identified patent and that said Letters Patent is hereby corrected as shown below:

Column 2,
Line 7, “stress wave in solid or hollow rods or tubes made of metal,” should read -- stress waves in solid or hollow rods or tubes made of metal, --;

Column 8,
Line 33, “that the cross-sectional dimensions are all much less then the” should read -- that the cross-sectional dimensions are all much less than the --;

Column 9,
Line 58, “corresponding to transit times when the waveguide” should read -- corresponding to transit times when the waveguide is --;
Line 60, “difference $\Delta t$_=$_{t\_t0}$ is used (as known in the art) to” should read -- difference $\Delta t = t\text{-}t_0$ is used (as known in the art) to --;

Column 10,
Line 54, “from a pipe or spoolpiece. hi this numerical example, the” should read -- from a pipe or spoolpiece. In this numerical example, the --.

Signed and Sealed this

Thirtieth Day of August, 2005

JON W. DUDAS
*Director of the United States Patent and Trademark Office*